(12) United States Patent
Hanya

(10) Patent No.: US 6,352,091 B1
(45) Date of Patent: Mar. 5, 2002

(54) VEHICLE TIRE HAVING UNIDIRECTIONAL PATTERN WITH MIRROR IMAGE PATTERNS OF OUTER PARTS BEING CIRCUMFERENTIALLY SHIFTED

(75) Inventor: Masahiro Hanya, Kobe (JP)

(73) Assignee: Sumitomo Rubber Industries, Ltd., Hyogo-ken (JP)

(*) Notice: Subject to any disclaimer, the term of this patent is extended or adjusted under 35 U.S.C. 154(b) by 0 days.

(21) Appl. No.: 09/455,786

(22) Filed: Dec. 7, 1999

(51) Int. Cl.$^7$ .................. B60C 11/03; B60C 11/12; B60C 113/00; B60C 115/00
(52) U.S. Cl. .................. 152/209.2; 152/209.28; 152/DIG. 3
(58) Field of Search .................. 152/209.2, 209.3, 152/209.28, DIG. 3

(56) References Cited

U.S. PATENT DOCUMENTS

| | | | | |
|---|---|---|---|---|
| 2,094,636 A | * | 10/1937 | Bull | 152/209.28 |
| 3,094,157 A | * | 6/1963 | Klohn | 152/209.2 |
| 4,178,199 A | * | 12/1979 | Lippman et al. | 152/209.2 |
| 4,474,223 A | * | 10/1984 | Landers | 152/209.2 |
| 4,641,695 A | * | 2/1987 | Lindner | 152/209.28 |
| 5,309,965 A | * | 5/1994 | Williams | 152/209.2 |
| 5,327,952 A | * | 7/1994 | Glover et al. | 152/209.28 |
| 5,435,364 A | * | 7/1995 | Hasegawa et al. | 152/209.28 |
| 5,746,848 A | * | 5/1998 | Schulze et al. | |
| 5,865,921 A | * | 2/1999 | Zakelj et al. | |

FOREIGN PATENT DOCUMENTS

| | | | |
|---|---|---|---|
| JP | 5-69706 | * | 3/1993 |
| JP | 8-230415 | * | 9/1996 |

* cited by examiner

*Primary Examiner*—Steven D. Maki
(74) *Attorney, Agent, or Firm*—Birch, Stewart, Kolasch & Birch, LLP

(57) ABSTRACT

A vehicle tire has an unidirectional tread pattern, and the tread portion is provided with two circumferential grooves to divide the tread portion into two outer parts and a central part there between, the central part being substantially continuous in the tire circumferential direction and formed symmetrically about the tire equator. The outer parts are provided with mirror-image patterns, each formed by circumferentially repeating pattern units having an average circumferential length, and the mirror-image patterns are circumferentially shifted from each other by a distance S of from 0.15 to 0.25 times the above-mentioned average circumferential length.

10 Claims, 3 Drawing Sheets

VEHICLE TIRE HAVING UNIDIRECTIONAL PATTERN WITH MIRROR IMAGE PATTERNS OF OUTER PARTS BEING CIRCUMFERENTIALLY SHIFTED

BACKGROUND OF THE INVENTION

The present invention relates to a vehicle tire having a unidirectional tread pattern being capable of reducing pattern noise during running.

PRIOR ART

In general, vehicle tires such as pneumatic tires are provided with various tread patterns to secure wet grip. Especially, unidirectional tread patterns symmetrical about the tire equator are widely employed in passenger car tires in recent years.

In such unidirectional tread patterns, edges of tread grooves, especially those of axial or bias grooves formed on both sides of the tire equator are liable to contact with the ground synchronously. As a result, running noise and so called pattern noise is liable to increase when compared with bi-directional tread pattern.

SUMMARY OF THE INVENTION

It is therefore an object of the present invention to provide a pneumatic tire which has a unidirectional tread pattern capable of improving the pattern noise.

According to the present invention, a vehicle tire comprises a tread portion provided with a unidirectional pattern, the tread portion provided with two circumferential grooves to divide the tread portion into two outer parts and a central part therebetween, the central part being substantially continuous in the tire circumferential direction and formed symmetrically about the tire equator, the outer parts provided with mirror-image patterns respectively, each of the mirror-image patterns formed by circumferentially repeating pattern units having an average circumferential length, and the mirror-image patterns of the two outer parts being circumferentially shifted from each other by a distance of from 0.15 to 0.25 times the average circumferential length.

Embodiments of the present invention will now be described in detail in conjunction with the accompanying drawings.

DETAILED DESCRIPTION OF THE INVENTION

Figure 1:
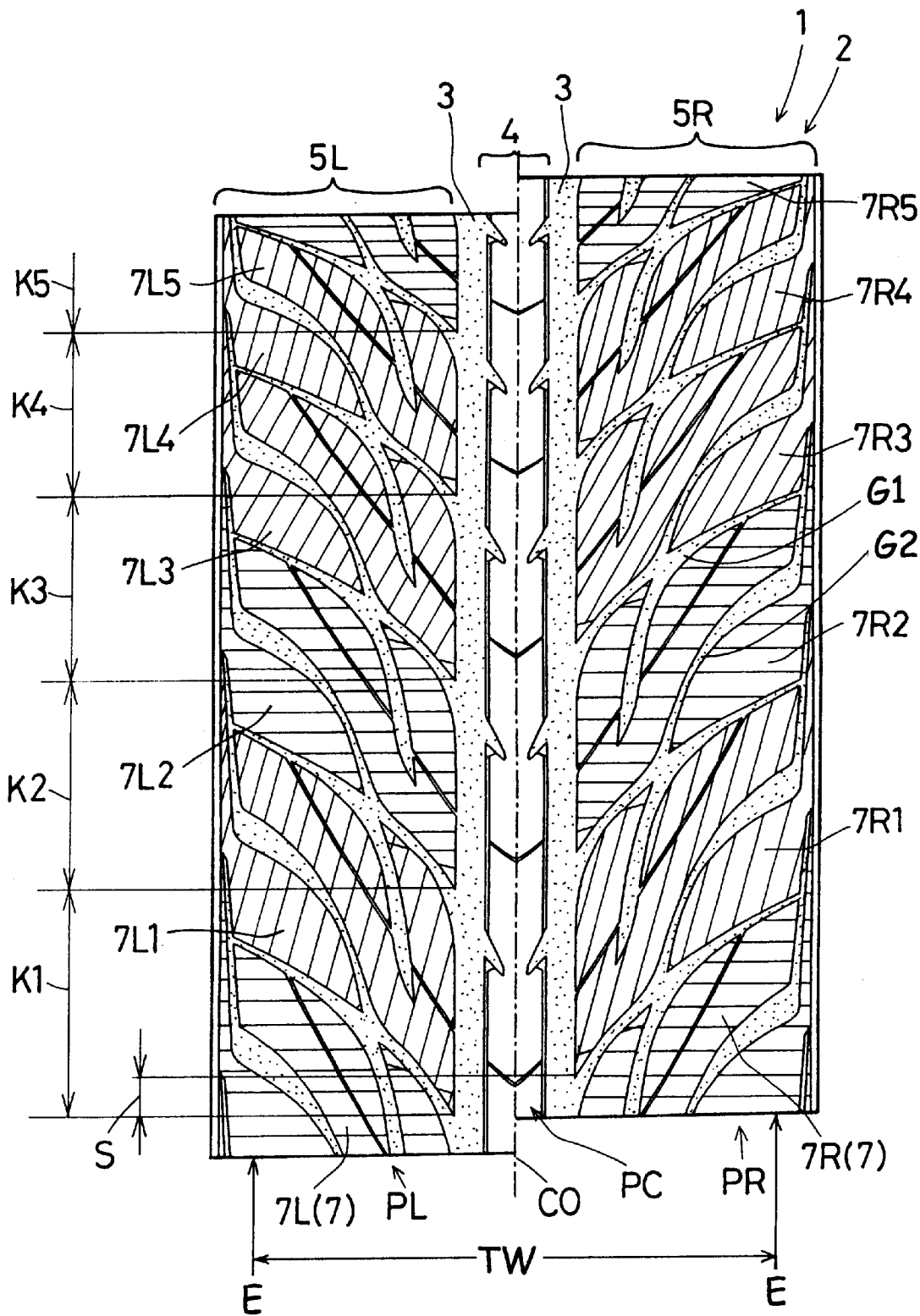
FIG. 1 is a developed view showing a tread pattern according to the present invention.

In FIG. 1, a vehicle tire 1 according to the present invention is a pneumatic tire for passenger cars, and the tire 1 is provided in the tread portion 2 with a unidirectional tread pattern.

In the tread portion 2, a pair of circumferential grooves 3 are disposed one on each side of the tire equator CO to divide the tread portion 2 into a central part 4 therebetween and a pair of right and left outer parts 5R and 5L axially outside the grooves 3.

Figure 2:
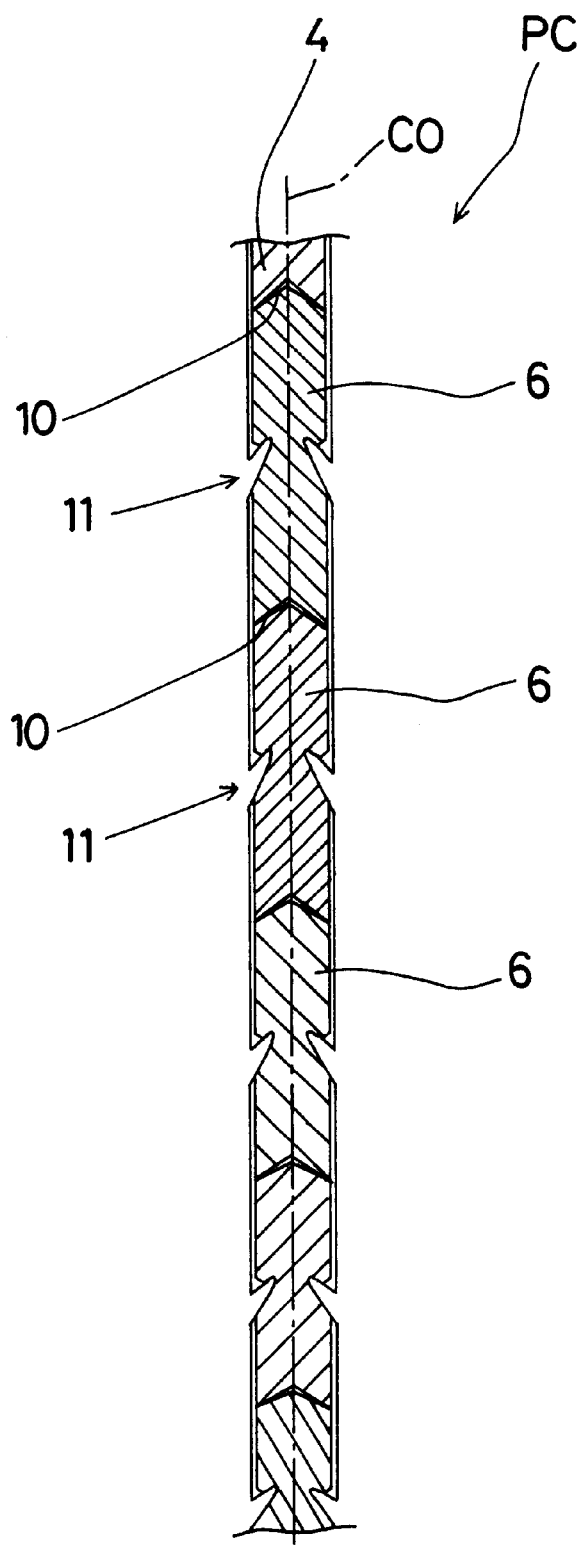
FIG. 2 is a view for explaining the repetition of pattern units in the central tread part.

The central part 4 is formed symmetrically about the tire equator CO and substantially continuous in the tire circumferential direction to form a rib. In this embodiment, the central part 4 is provided with a symmetrical pattern PC. As shown in FIG.2. the symmetrical pattern PC is formed by repeating pattern units 6 in the tire circumferential direction. Each pattern unit 6 is also symmetrical about the tire equator CO. The pattern units 6 are identical with each other except for the circumferential lengths or pitch lengths. The lengths can be determined according to known variable pitching methods.

The right and left outer parts 5R and 5L are provided with right and left mirror-image patterns PR and PL, respectively. Each of the mirror-image patterns PR and PL is formed by repeating a plurality of kinds of pattern units 7 (7R, 7L) in the tire circumferential direction. The sequence or order of the pattern units 7R in the right mirror-image pattern PR is the same as that of the pattern units 7L in the left mirror-image pattern PL. The pattern units 7R in the right mirror-image pattern PR include a number N of pattern units 7R1 to 7RN, and the pattern units 7L in the right mirror-image pattern PL include the same number N of pattern units 7L1 to 7LN, wherein the pattern units 7R1 to 7RN are mirror-images of the pattern units 7L1 to 7LN, respectively. The pattern units 7R, 7L are identical with each other except for the circumferential lengths or pitch lengths. The lengths and the above-mentioned sequence can be determined according to known variable pitching methods. The number N is preferably 3 to 7. In this embodiment, the number N is 5.

In FIG. 1, the above-mentioned circumferential grooves 3 are an straight groove. The central part 4 is provided with V-shaped sipes 10 and notches 11. The sipes 10 extend across the axial width of the central part 4. The width of the sipe is less than 2 mm, usually less than 1 mm, and the depth is less than that of the circumferential grooves 3. The notches 11 are formed on both sides of the central part 4. The sipes 10 and notches 11 are arranged alternately in the tire circumferential direction. The sipes are narrow and relatively shallow and the notches are not reached to the tire equator CO. Therefore, the central part 4 is substantially continuous in the tire circumferential direction and forms a rib. Incidentally, the central part 4 can be formed as a straight rib, variable-width rib or the like which is provided with neither sipe nor notch nor groove.

Further, the outer parts 5R and 5L in FIG. 1 are provided with bias grooves G1 extending from the tread edges E to the circumferential grooves 3 and bias grooves G2 extending from the tread edges E at positions between the bias grooves G1 towards the axially inside. Each of the bias grooves G2 is curved to cross the first adjacent bias groove G1, but terminates before the second adjacent bias groove G1 to form a closed end. The inclination of the bias grooves G2 becomes steeper from the axially inner closed end to the axially open end.

The width of the central part is set in a range of from 6 to 20% of the tread width TW. Each circumferential groove 3 is disposed in a range of from 4.5 to 19% of the tread width TW from the tire equator CO. The width of the circumferential grooves is in the range of from 5 to 20 mm.

According to the present invention, the right mirror-image pattern PR must be circumferentially shifted from the left mirror-image pattern PL by a predetermined distance S. If the patterns are not shifted, the tread pattern as a whole will be completely symmetrical about the tire equator CO.

It is necessary to set the pattern shift distance S in the range of from 0.15 to 0.25 times the average of the different circumferential lengths K1 to Kn of the number N of the pattern units (7R1=7L1) to (7RN=7LN). In this embodiment, the average circumferential length K is the average of the circumferential lengths K1, K2, K3, K4 and K5 of the pattern units (7R1, 7L1), (7R2, 7L2), (7R3, 7L3), (7R4, 7L4) and (7R5, 7L5). By setting the distance S in the above-mentioned range, noise frequency dispersion is promoted to improve the pattern noise, and the wet grip performance can be maintained at the same high level as the completely symmetrical tread pattern in which S=0.

Figure 3:
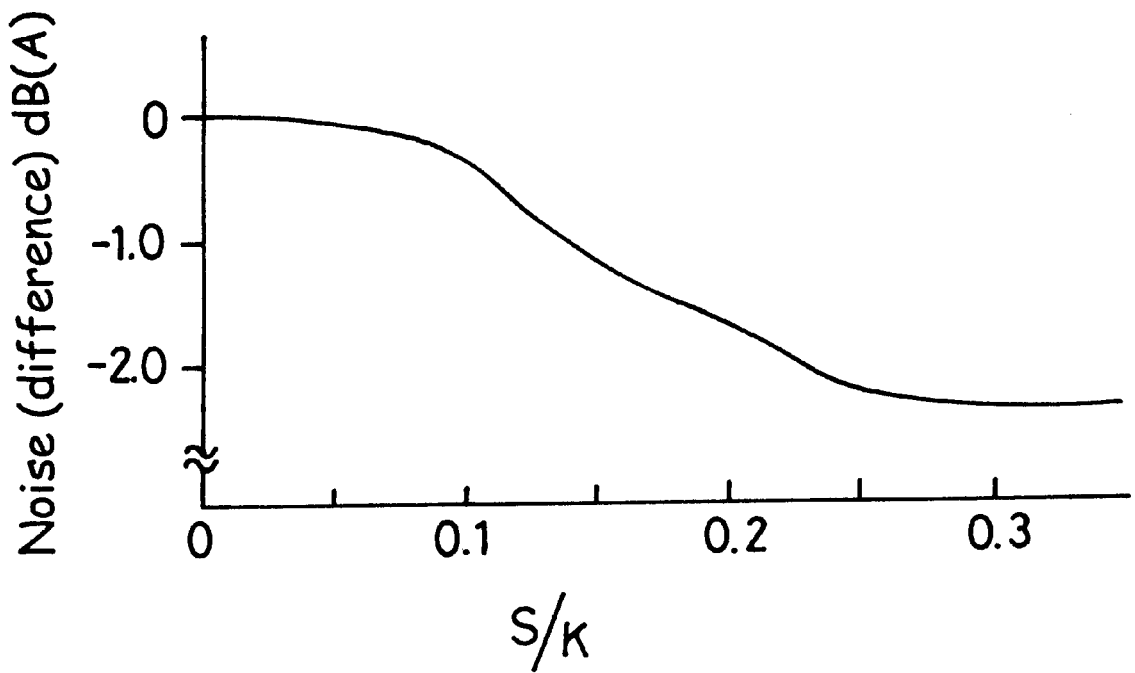
FIG. 3 is a graph showing the relationship between the pattern noise and pattern shift.

FIG. 3 shows a relationship between the shift distance S and pattern noise, which was obtained by an inventor's test. In this test, test tires of size 235/45ZR17 (for 17X8JJ Rim) having the same tread pattern shown in FIG. 1 except for shift length S were prepared. Then, a test car (2500 cc FR passenger car) provided on all the wheels with the test tires was run on a smooth asphalt road at a speed of 50 km/h and the noise in dB(A) was measured near the driver's ears as the pattern noise. In FIG.3, the measured pattern noise is indicated by a relative value based on a tire whose S=0 being 0 dB(A).

From the test, it was confirmed that when the ratio S/K increases over about 0.1, the noise starts to reduce, and the reduction continues to about 0.25. But if the ratio exceeds 0.25, the noise reduction stops and the tire appearance is liable to become odd.

The following Table 1 shows the results of further tests for steering stability and ride comfort. The pattern noise measured as above is also shown therein.

(1) Steering stability test: The above-mentioned test car was run on an asphalt road in a tire test course, and the test driver evaluated the steering response, tire rigidity and road grip as the steering stability into ten ranks by his feelings, wherein the higher the rank, the better the steering stability.

(2) Ride comfort test: During running the test car on a rough road in the tire test course, harshness, thrust-up and the like were evaluated as the ride comfort into ten ranks by the test diver's feelings. The higher the rank, the better the ride comfort.

TABLE 1

| Tire | Ref. 1 | Ref. 2 | Ex. 1 | Ex. 2 | Ex. 3 | Ref. 3 |
| --- | --- | --- | --- | --- | --- | --- |
| Pattern shift S/K | 0 | 0.1 | 0.15 | 0.2 | 0.25 | 0.3 |
| Steering stability | 6 | 6 | 6 | 6 | 6 | 6 |
| Ride comfort | 6 | 6 | 6 | 6 | 6 | 6 |
| pattern noise | 0 | −0.3 | −1.2 | −1.6 | −2.1 | −2.3 |

Traed pattern: FIG. 1
Air pressure: 230 kPa,

From the tests, it was confirmed that the tires according to the present invention can be improved in the pattern noise without deteriorating the steering stability and ride comfort.

The present invention can be applied to various tires, for example, heavy duty tires, light-truck tires and the like in addition to passenger car tires. Further, apart from the tread pattern and pattern units shown in FIGS. 1 and 2, various patterns and units can be employed.

What is claimed is:

1. A vehicle tire comprising
a tread portion provided with a unidirectional pattern,
the tread portion provided with two circumferential grooves to divide the tread portion into two outer parts and a central part therebetween,
the central part being substantially continuous in the tire circumferential direction and formed symmetrically about the tire equator,
the outer parts provided with mirror-image patterns, respectively,
each of the mirror-image patterns formed by circumferentially repeating pattern units having an average circumferential length, and
the mirror-image patterns of one of the outer parts circumferentially shifted from those. of the other outer part by a distance S of from 0.15 to 0.25 times said average circumferential length.

2. The vehicle tire according to claim 1, wherein
each of the mirror-image patterns of the outer parts is formed by repeating a number N of pattern units having different circumferential lengths, and the number N is in the range of from 3 to 7.

3. The vehicle tire according to claim 1, wherein
the outer parts are provided with bias grooves G1 extending from tread edges of the tread portion to the circumferential grooves and bias grooves G2 extending from the tread edges at positions between the bias grooves G1 towards the axially inside, and
each of the bias grooves G2 is curved to cross a first adjacent bias groove G1, but terminates before a second adjacent bias groove G1 to form a closed end.

4. The vehicle tire according to claim 1, wherein
the central part is provided with notches on both sides thereof and sipes extending across the width thereof.

5. A vehicle tire comprising
a tread portion provided with a unidirectional pattern,
the tread portion provided with two circumferential grooves to divide the tread portion into two outer parts and a central part therebetween,
the central part being substantially continuous in the tire circumferential direction and formed symmetrically about the tire equator,
the outer parts provided with mirror-image patterns, respectively,
each of the mirror-image patterns formed by circumferentially repeating pattern units having an average circumferential length, and
the mirror-image patterns of one of the outer parts circumferentially shifted from those of the other outer part by a distance S of from 0.15 to 0.25 times said average circumferential length wherein
the central part is provided with a pattern symmetrical about the tire equator.

6. The vehicle tire according to claim 5, wherein
said symmetrical pattern of the central part comprises
sipes extending across the central part and
notches formed on both sides of the central part and alternating with the sipes in the circumferential direction.

7. The vehicle tire according to claim 6, wherein said sipes are V-shaped.

8. The vehicle tire according to claim 2, wherein the number N of pattern units having different circumferential lengths is 4, 5, 6 or 7.

9. The vehicle tire according to claim 2, wherein
the number N of pattern units having different circumferential lengths is 5, 6 or 7.

10. The vehicle tire according to claim 2, wherein
the number N of pattern units having different circumferential lengths is 5 or 6.

* * * * *

UNITED STATES PATENT AND TRADEMARK OFFICE
CERTIFICATE OF CORRECTION

PATENT NO.    : 6,352,091 B1
DATED         : March 5, 2002
INVENTOR(S)   : Masahiro Hanya It is certified that error appears in the above-identified patent and that said Letters Patent is hereby corrected as shown below:

<u>Title page,</u>
Item [30], Foreign Application Priority Data, please insert item as follows:

-- [30]    Foreign Application Priority Data
    Dec.7, 1998    (JP) Japan ......................... 10-347351. --

Signed and Sealed this

Twenty-ninth Day of October, 2002

Attest:

Attesting Officer

JAMES E. ROGAN
*Director of the United States Patent and Trademark Office*